United States Patent [19]
Kosal et al.

[11] Patent Number: 5,527,476
[45] Date of Patent: Jun. 18, 1996

[54] CATALYST COMPOSITION AND METHODS FOR THE PREPARATION THEREOF

[75] Inventors: Jeffrey A. Kosal, Midland; Anthony Revis, Freeland, both of Mich.

[73] Assignee: Dow Corning Corporation, Midland, Mich.

[21] Appl. No.: 458,863

[22] Filed: Jun. 2, 1995

Related U.S. Application Data

[62] Division of Ser. No. 176,168, Dec. 30, 1993, Pat. No. 5,464,801.

[51] Int. Cl.$^6$ .................................................. D06M 13/10
[52] U.S. Cl. ............................ 252/8.6; 252/8.7; 252/8.75; 252/8.8; 252/8.9; 8/115.6; 428/389; 428/391
[58] Field of Search ................ 502/150, 170, 172, 326; 252/8.6, 8.7, 8.75, 8.8, 8.9; 8/115.6; 428/389, 391

[56] References Cited

U.S. PATENT DOCUMENTS

| | | | |
|---|---|---|---|
| 3,960,810 | 6/1976 | Chandra et al. | 528/31 |
| 4,154,714 | 5/1979 | Hockemeyer et al. | 524/268 |
| 4,262,107 | 4/1981 | Eckberg | 528/15 |
| 4,281,093 | 7/1981 | Garden | 528/15 |
| 4,448,815 | 5/1984 | Grenoble et al. | 427/387 |
| 4,476,166 | 10/1984 | Eckberg | 427/387 |
| 4,746,750 | 5/1988 | Revis | 556/443 |
| 4,933,002 | 6/1990 | Petroff et al. | 71/116 |
| 4,954,401 | 9/1990 | Revis | 428/412 |
| 4,954,554 | 9/1990 | Bunge | 528/388 |
| 4,954,597 | 9/1990 | Revis | 528/15 |
| 5,000,861 | 3/1991 | Yang | 252/8.6 |
| 5,063,260 | 11/1991 | Chen et al. | 523/213 |
| 5,082,735 | 1/1992 | Revis et al. | 428/412 |
| 5,095,067 | 3/1992 | Hara et al. | 524/506 |
| 5,104,927 | 4/1992 | Hara et al. | 524/731 |

*Primary Examiner*—Anthony Green
*Attorney, Agent, or Firm*—Timothy J. Troy

[57] ABSTRACT

The present invention relates to catalyst compositions and methods for the preparation thereof. More particularly, the present invention relates to novel rhodium catalyst complexes compositions useful the crosslinking of compositions containing methylhydrogensiloxanes. The present invention further relates to a method for the preparation of these novel catalyst complexes and to their use in emulsions of methylhydrogensiloxanes which are used to treat fibers or fabrics.

31 Claims, No Drawings

CATALYST COMPOSITION AND METHODS FOR THE PREPARATION THEREOF

This is a divisional of application Ser. No. 08/176,168 filed on Dec. 30, 1993, U.S. Pat. No. 5,464,801.

BACKGROUND OF THE INVENTION

The present invention relates to catalyst compositions and to methods for the preparation thereof. More particularly, the present invention relates to novel rhodium catalyst complexes useful in the crosslinking of compositions containing methylhydrogensiloxanes. The present invention further relates to a method for the preparation of these novel catalyst complexes and to their use in emulsions of methylhydrogensiloxanes which are used to treat fibers or fabrics.

Compositions containing an unsaturated acetate and a rhodium catalyst have been described in the art. For example, Revis in U.S. Pat. Nos. 4,954,401 and 5,082,735 discloses a process of curing and crosslinking methylhydrogensiloxanes by contacting and forming a mixture of an allyl ester with at least one methylhydrogensiloxane in the presence of a Group VIII metal catalyst, and heating the mixture of the allyl ester, the methylhydrogensiloxane, and the Group VIII metal catalyst, in the presence of ambient moisture until the methylhydrogensiloxane becomes cured and crosslinked. The preferred catalyst is disclosed as being $RhCl_3$.

Revis in U.S. Pat. No. 4,954,597 discloses a coating for a paper substrate produced by contacting and forming a mixture of an allyl ester with at least one methylhydrogensiloxane in the presence of a Group VIII metal catalyst, and heating the mixture of the allyl ester, the methylhydrogensiloxane, the substrate and the Group VIII metal catalyst, in the presence of ambient moisture until the methylhydrogensiloxane becomes cured and crosslinked. The preferred Group VIII metal catalyst is disclosed as being $RhCl_3$.

Revis in U.S. Pat. No. 4.746.750 discloses a process for preparing silyl ketene acetals from allyl 2-organoacrylates comprising contacting an allyl 2-organoacrylate with a trisubstituted silane in the presence of a rhodium catalyst such as $RhCl_3 \cdot 3H_2O$ and separating and isolating the silyl ketene acetal.

The present invention further relates to fiber treatment compositions containing the catalyst compositions of the instant invention. Compositions containing rhodium catalysts in combination with organohydrogenpolysiloxanes have also been disclosed. For example, Chandra et al. in U.S. Pat. No. 3,690,810 discloses a process for coating a surface with an organosiloxane composition to render it non-adherent, the organosiloxane composition is disclosed as being substantially solvent-free, having a viscosity not exceeding 4,000 cS at 25° C., and comprising (1) a polydiorganosiloxane having silicon-bonded vinyl radicals, (2) an organohydrogenpolysiloxane, and a catalyst having the formulae $RhX_3(SR_2)_3$ or $Rh_2(CO)_4X_2$ in which X is a halogen, preferably chlorine, and each R is alkyl, aryl, aralkyl, alkylaryl or $R'_3SiQ$ wherein Q is a divalent aliphatic hydrocarbon radical and R' is alkyl, aryl, aralkyl, alkylaryl or $(CH_3)_3Si—$.

Garden in U.S. Pat. No. 4,281,093 discloses a catalyst composition comprising a solution of an organometallic complex of platinum or rhodium in a liquid allyl ether which has a boiling point of at least 150° C. at 1 bar and which is free from groups having an adverse effect on the catalytic affect of the complex; polyorganosiloxane coating compositions containing a Si-H polysiloxane and a polysiloxane containing Si-OH Si-vinyl, or Si-allyl groups, an organometallic complex of platinum or rhodium, and an allyl ether as defined above; and the use of the compositions for preparing release coatings on substrates.

Chen et al., in U.S. Pat. No. 5,063,260 discloses curable silicone compositions which impart beneficial characteristics to fibers, the compositions comprising an amino organofunctional substantially linear polydiorganosiloxane polymer, a blend of an epoxy organofunctional substantially linear polydiorganosiloxane polymer and a carboxylic acid organofunctional substantially linear polydiorganosiloxane polymer, and an aminoorganosilane. Chen et al. also discloses a process for the treatment of animal, cellulosic, and synthetic fibers by applying the composition described above the fiber and thereafter curing the composition on the fiber to obtain a treated fiber.

Yang in European Patent Application No. 0415254 discloses stable aqueous emulsion compositions containing an aminofunctional polyorganosiloxane containing at least two amino functionalized groups per molecule, one or more silanes and optionally a hydroxy terminated polydiorganosiloxane, textiles treated with the emulsion compositions, and processes for the preparation of the emulsion compositions.

Bunge in U.S. Pat. No. 4,954,554 discloses aqueous emulsions compositions consisting essentially of a curable silicone composition comprising organopolysiloxane having silicon-bonded hydroxyl radicals or silicon-bonded olefinic radicals, an organohydrogenpolysiloxane and a curing catalyst, a polyvinylalcohol emulsifying agent having a degree of hydrolysis of 90 mole percent or more, and water. These compositions are disclosed as having improved gloss and/or water-repellency and/or adhesive release.

Other silicone emulsions containing olefinic siloxanes have been disclosed. For example, Hara et al. in U.S. Pat. Nos. 5,095,067 and 5,104,927 teaches a release silicone emulsion composition comprising 100 parts by weight of a specific organovinylpolysiloxane , from 1 to 50 parts by weight of a specific organohydrogensiloxane, from 0.5 to 5 parts of a platinum catalyst having a viscosity of 10 centistokes or less at 25° C., from 1.5 to 15 parts by weight of a nonionic emulsifying agent having an average HLB of from 10 to 20, and a Ph of 6.5 or less, and water. These compositions are disclosed as having good pot life, curability and that the cured film has good release properties and residual adhesive properties of adhesives.

However, none of the references hereinabove disclose a rhodium catalyst composition comprising a rhodium catalyst, an unsaturated acetate, and an alcohol having 3 or more carbon atoms or a siloxane composition containing such a catalyst.

SUMMARY OF THE INVENTION

This invention relates to novel rhodium catalyst complex compositions comprising (A) a rhodium catalyst, (B) an unsaturated acetate, and (C) alcohols having having 3 or more carbon atoms.

The present invention further relates to method of making a rhodium catalyst complex, the method comprising the steps of (I) mixing: (A) rhodium catalyst, (B) an alcohol having 3 or more carbon atoms, and (C) an unsaturated acetate.

The present invention also relates to fiber treatment compositions comprising (A) a rhodium catalyst, (B) an unsaturated acetate, (C) alcohols having having 3 or more carbon atoms, and (D) at least one methylhydrogensiloxane. The fiber treatment compositions can further comprise (E) an organosilicon compound having an average of at least one group per molecule selected from the group consisting of hydroxy groups, carboxy groups, ester groups, amino groups, acetoxy groups, sulfo groups, alkoxy groups, acrylate groups, epoxy groups, fluoro groups, ether groups, olefinic hydrocarbon or halohydrocarbon radicals having from 2 to 20 carbon atoms, and mixtures thereof According to the present invention it has been surprisingly discovered that commercially available rhodium catalysts can be complexed with unsaturated acetates and alcohols which can be useful for the crosslinking of methylhydrogensiloxanes. These catalysts are particularly effective in the crosslinking of emulsions of methylhydrogensiloxanes which are then applied to textile fiber substrates.

It is an object of this invention to provide novel rhodium catalyst complexes for the crosslinking of compositions containing methylhydrogensiloxanes.

It is also an object of this invention to improve the heat age stability of emulsions containing methylhydrogensiloxanes.

It is an additional object of this invention to provide novel rhodium catalyst complexes which improve the flow out, slickness, softness, and compression resistance of emulsions containing methylhydrogensiloxanes on textile substrates.

These and other features, objects and advantages of the present invention will be apparent upon consideration of the following detailed description of the invention.

DETAILED DESCRIPTION OF THE INVENTION

The present invention relates to rhodium catalyst complex compositions comprising (A) a rhodium catalyst, (B) an unsaturated acetate, and (C) alcohols having having 3 or more carbon atoms.

Component (A) in the catalyst compositions of the present invention is a rhodium catalyst. The preferred rhodium catalysts are rhodium catalysts with inorganic ligands. The preferred rhodium catalysts as Component (A) for the compositions of the present invention are $RhCl_3$, $RhBr_2$, and $RhI_3$ and complexes thereof. Thus the rhodium catalyst with inorganic ligands can be, for example, $RhCl_3.nH_2O$, $RhBr_3.nH_2O$, $Rh(NO_3)_3.nH_2O$, or $Rh(SO_4)_3.nH_2O$ wherein n has a value of from 1 to 10. Preferred as rhodium catalysts for the present invention are $RhCl_3.3H_2O$, $RhCl_3.6H_2O$, $RhBr_3.3H_2O$, and $RhBr_3.6H_2O$.

The amount of rhodium catalyst, Component (A), that are used in the compositions of this invention is not narrowly limited and can be readily determined by one skilled in the art by routine experimentation. However, the most effective concentration of rhodium metal catalyst has been found to be from about one part per million to about two thousand parts per million on a weight basis relative to the unsaturated acetate of Component (B).

Component (B) in the catalyst compositions of the instant invention is an unsaturated acetate. The unsaturated acetate can be an allyl ester or vinyl ester such as allyl butyrate, allyl acetate linallyl acetate, allyl methacrylate, vinyl acetate, allyl acrylate, vinyl butyrate, isopropenyl acetate, vinyl trifluoroacetate, 2-methyl-1-butenyl acetate, vinyl 2-ethyl hexanoate, vinyl 3,5,5-trimethylhexanoate, allyl 3-butenoate, bis(2-methylallyl) carbonate, diallyl succinate, ethyl diallylcarbamate, and other known allyl esters. It is preferred for the compositions of the instant invention that the unsaturated acetate is selected from the group consisting of allyl acetate, linallyl acetate, and isopropenyl acetate.

The amount of Component (B) employed in the compositions of the present invention varies depending on the amount of rhodium catalyst (A) and alcohol (C) is employed. It is preferred for purposes of this invention that the molar amount of unsaturated acetate is equal to or greater than the molar amount of rhodium catalyst. It is preferred for the instant invention that Component (B) be used in a molar amount equal to the molar amount of rhodium catalyst to as much as ten times greater than the molar amount of rhodium catalyst employed.

Component (C) in the catalyst compositions of the instant invention are alcohols having having 3 or more carbon atoms. For the compositions of the instant invention any alcohol containing at least 3 carbon atoms is suitable. For example, $C_3$ and greater diols, furans having at least one OH group per molecule, and pyrans having at least one OH group per molecule are suitable for use as Component (C) in the catalyst compositions of the present invention. The diols which can be used as the alcohol in the instant invention are exemplified by 1,2-propanediol, 1,3-propanediol, 1,3-butanediol, 1,4-butanediol, 1,2-pentanediol, 1,4-pentanediol, 1,5-pentanediol, 1,6-hexanediol, 1,5-hexanediol, 1,7-heptanediol, 1,9-nonanediol, 1,2-decanediol, 1,10-decanediol, and 2-phenyl-1,2-propanediol. Other alcohols suitable for use as Component (C) of the instant invention include 1-hexanol, 1-heptanol, benzyl alcohol, 1-octanol, 1-nonanol, 1-decanol, undecylenyl alcohol, 2,4-dichlorobenzyl alcohol, phenethyl alcohol, 1-undecanol, 2-methylbenzyl alcohol, 3-methylbenzyl alcohol, and 2-phenyl-1-propanol. Examples of OH-containing furans and pyrans which are suitable for use as Component (C) in the compositions of the instant invention include 5-methyl tetrahydrofuran-2-methanol, 2-hydroxy-2-(hydroxymethyl) tetrahydrofuran, dihydro-5-(hydroxymethyl)-2-(3H)-furone, tetrahydropyran-2-methanol, tetrahydro-3-furan methanol, furfuryl alcohol, and tetrahydrofurfuryl alcohol.

The amount of Component (C) employed in the compositions of the present invention varies depending on the amount of rhodium catalyst (A) and unsaturated acetate (B) is employed. It is preferred for purposes of this invention that the molar amount of (C) is equal to or greater than the molar amount of rhodium catalyst (A). It is preferred for the instant invention that Component (C) be used in a molar amount equal to the molar amount of rhodium catalyst to as much as 1000 times greater than the molar amount of rhodium catalyst employed. It is further preferred in the present invention that an amount sufficient to dissolve rhodium catalyst (A) is employed.

The catalyst compositions of this invention can be prepared by homogeneously mixing Components (A), (B), and (C) and any optional components in any order. Thus it is possible to mix all components in one mixing step immediately prior to using the catalyst compositions of the present invention.

The present invention further relates to method of making a rhodium catalyst complex, the method comprising the steps of (I) mixing: (A) rhodium catalyst, (B) an unsaturated acetate, and (C) an alcohol having 3 or more carbon atoms, The rhodium catalyst (A), unsaturated acetate (B), and alcohol having 3 or more carbon atoms (C) are as delineated above including preferred amounts and embodiments thereof.

The present invention also relates to fiber treatment compositions comprising (A) a rhodium catalyst, (B) an unsaturated acetate, (C) alcohols having having 3 or more carbon atoms, and (D) at least one organohydrogensiloxane. The rhodium catalyst (A), unsaturated acetate (B), and alcohol having 3 or more carbon atoms (C) are as delineated above including preferred amounts and embodiments thereof.

Component (D) in the fiber treatment compositions of the present invention is at least one organohydrogensilicon compound which is free of aliphatic unsaturation and contains two or more silicon atoms linked by divalent radicals, an average of from one to two silicon-bonded monovalent radicals per silicon atom and an average of at least one, and preferably two, three or more silicon-bonded hydrogen atoms per molecule thereof. Preferably the organohydrogensiloxane in the compositions of the present invention contains an average of three or more silicon-bonded hydrogen atoms such as, for example, 5, 10, 20, 40, 70, 100, and more.

The organohydrogenpolysiloxane is preferably a compound having the average unit formula $R^1_a H_b SiO_{(4-a-b)/2}$ wherein $R^1$ denotes said monovalent radical free of aliphatic unsaturation, the subscript b has a value of from greater than 0 to 1, such as 0.001, 0.01, 0.1 and 1.0, and the sum of the subscripts a plus b has a value of from 1 to 3, such as 1.2, 1.9 and 2.5. Siloxane units in the organohydrogenpolysiloxanes having the average unit formula immediately above formulae $R^3_3 SiO_{1/2}$, $R^3_2 HSiO_{1/2}$, $R^3_2 SiO_{2/2}$, $R^3 HSiO_{2/2}$, $R^3 SiO_{3/2}$, $HSiO_{3/2}$ and $SiO_{4/2}$. Said siloxane units can be combined in any molecular arrangement such as linear, branched, cyclic and combinations thereof, to provide organohydrogenpolysiloxanes than are useful as component (D) in the compositions of the present invention.

A preferred organohydrogenpolysiloxane for the compositions of this invention is a substantially linear organohydrogenpolysiloxane having the formula $XR_2SiO(XRSiO)_c SiR_2X$ wherein each R denotes a monovalent hydrocarbon or halohydrocarbon radical free of aliphatic unsaturation and having from 1 to 20 carbon atoms. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for the silicon-containing components of this invention are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2$- wherein the subscript n has a value of from 1 to 10, such as, for example, $CF_3CH_2CH_2$- and $C_4F_9CH_2CH_2$-. The several R radicals can be identical or different, as desired. Additionally, each X denotes a hydrogen atom or an R radical. Of course, at least two X radicals must be hydrogen atoms. The exact value of y depends upon the number and identity of the R radicals; however, for organohydrogenpolysiloxanes containing only methyl radicals as R radicals c will have a value of from about 0 to about 1000.

In terms of preferred monovalent hydrocarbon radicals, examples of organopolysiloxanes of the above formulae which are suitable as the organohydrogensiloxane for the compositions of this invention include $HMe_2SiO(Me_2SiO)_c SiMe_2H$, $(HMe_2SiO)_4Si$, cyclo(MeHSiO)$_c$, $(CF_3CH_2CH_2)MeHSiO\{Me(CF_3CH_2CH_2)SiO\}_c$ SiHMe($CH_2CH_2CF_3$), $Me_3SiO(MeHSiO)_c SiMe_3$, $HMe_2SiO(Me_2SiO)_{0.5c}$ $(MeHSiO)_{0.5c}SiMe_2H$, $HMe_2SiO(Me_2SiO)_{0.5c}(MePhSiO)_{0.1c}(MeHSiO)_{0.4c}$ $SiMe_2H$, $Me_3SiO(Me_2SiO)_{0.3c}(MeHSiO)_{0.7c}SiMe_3$ and $MeSi(OSiMe_2H)_3$ organohydrogenpolysiloxanes that are useful as Component (D).

Highly preferred linear organohydrogenpolysiloxanes for the method of this invention have the formula $YMe_2SiO(Me_2SiO)_p(MeYSiO)_q SiMe_2Y$ wherein Y denotes a hydrogen atom or a methyl radical. An average of at least two Y radicals per molecule must be hydrogen atoms. The subscripts p and q can have average values of zero or more and the sum of p plus q has a value equal to c, noted above. The disclosure of U.S. Pat. No. 4,154,714 shows highly-preferred organohydrogenpolysiloxanes.

Especially preferred as Component (D) are methylhydrogensiloxanes selected from the group consisting of bis(trimethylsiloxy)dimethyldihydrogendisiloxane diphenyldimethyldisiloxane diphenyltetrakis(dimethylsiloxy)disiloxane heptamethylhydrogentrisiloxane, hexamethyldihydrogentrisiloxane, methylhydrogencyclosiloxanes, methyltris(dimethylhydrogensiloxy)silane, pentamethylpentahydrogencyclopentasiloxane, pentamethylhydrogendisiloxane, phenyltris(dimethylhydrogensiloxy)silane, polymethylhydrogensiloxane, tetrakis(dimethylhydrogensiloxy) silane, tetramethyltetrahydrogencyclotetrasiloxane, tetramethyldihydrogendisiloxane, and methylhydrogendimethylsiloxane copolymers.

The amount of Component (D) employed in the compositions of the present invention varies depending on the amount of unsaturated acetate, rhodium catalyst, and alcohol employed. It is preferred for purposes of this invention that from 40 to 99.5 weight percent of Component (D) be used, and it is highly preferred that from 70 to 90 weight percent of Component (D) be employed, said weight percent being based on the total weight of the composition.

The fiber treatment compositions can further comprise (E) an organosilicon compound having an average of at least one group per molecule selected from the group consisting of hydroxy groups, carboxy groups, ester groups, amino groups, acetoxy groups, sulfo groups, alkoxy groups, acrylate groups, epoxy groups, fluoro groups, ether groups, olefinic hydrocarbon or halohydrocarbon radicals having from 2 to 20 carbon atoms, and mixtures thereof. It is preferred for purposes of the present invention that Component (E) is a compound having its formula selected from the group consisting of (i) $R^1_3SiO(R_2SiO)_x(R^1RSiO)_ySiR^1_3$, (ii) $R_2R^1SiO(R_2SiO)_x(R^1RSiO)_y SiR_2R^1$, (iii) $RR^1_2SiO(R_2SiO)_x(R^1RSiO)_ySiRR^1_2$, wherein R is a monovalent hydrocarbon or halohydrocarbon radical having from 1 to 20 carbon atoms, $R^1$ is a group selected from the group consisting of hydroxy groups, carboxy groups, ester groups, amino groups, acetoxy groups, sulfo groups, alkoxy groups, acrylate groups, epoxy groups, fluoro groups, ether groups, olefinic hydrocarbon or halohydrocarbon radicals having from 2 to 20 carbon atoms, and mixtures thereof, x has a value of 0 to 3000, and y has a value of 1 to 100.

The monovalent radicals of R in Component (E) can contain up to 20 carbon atoms and include halohydrocarbon radicals free of aliphatic unsaturation and hydrocarbon radicals. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for the silicon—containing components of this invention are methyl and phenyl. Monovalent halohydrocarbon radicals include any monovalent hydrocarbon radical noted above which has at least one of its hydrogen atoms replaced with a halogen, such as fluorine, chlorine, or bromine. Preferred monovalent halohydrocarbon radicals have the formula $C_nF_{2n+1}CH_2CH_2$- wherein the subscript n has a value of from 1 to 10, such as, for example, $CF_3CH_2CH_2$- and $C_4F_9CH_2CH_2$-. The several R radicals can be identical or different, as desired and preferably at least 50 percent of all R radicals are methyl.

The functional groups of $R^1$ are selected from the group consisting of hydroxy groups, carboxy groups, ester groups, amino groups, acetoxy groups, sulfo groups, alkoxy groups, acrylate groups, epoxy groups, fluoro groups, ether groups, olefinic hydrocarbon or halohydrocarbon radicals having from 2 to 20 carbon atoms, and mixtures thereof. Hydroxy groups suitable for use in the compositions of the instant invention include hydroxyalkyl groups, hydroxyaryl groups, hydroxycycloalkyl groups, and hydroxycycloaryl groups. Preferred hydroxy (OH) groups as $R^1$ in the compositions of this invention include groups such as hydroxy, hydroxypropyl, hydroxybutyl, hydroxyphenyl, hydroxymethylphenyl, hydroxyethylphenyl, and hydroxycyclohexyl.

Carboxy groups suitable for use as $R^1$ in the compositions of the instant invention include carboxyalkyl groups, carboxyaryl groups, carboxycycloalkyl groups, and carboxycycloaryl groups. Preferred carboxy groups as $R^1$ in the compositions of this invention include groups such as carboxy, carboxymethyl, carboxyethyl, carboxypropyl, carboxybutyl, carboxyphenyl, carboxymethylphenyl, carboxyethylphenyl, and carboxycyclohexyl.

Ester groups can also be used as $R^1$ in the formulae hereinabove. These ester groups can include groups such as alkylesters, arylesters, cycloalkylesters, and cycloarylesters. Preferred ester groups suitable as $R^1$ in the instant invention are selected from the group consisting of ethyl acetate, methyl acetate, n-propyl acetate, n-butyl acetate, phenyl acetate, benzyl acetate, isobutyl benzoate, ethyl benzoate, ethyl propionate, ethyl stearate, ethyl trimethylacetate, methyl laurate, and ethyl palmitate.

Preferred amino groups as $R^1$ in the compositions of this invention are exemplified by groups having the formula $NR_2$ wherein R is hydrogen or a monovalent hydrocarbon radical having from 1 to 20 carbon atoms such as aminoalkyl groups, aminoaryl groups, aminocycloalkyl groups, and aminocycloaryl groups. Preferred as amino groups in the instant invention are groups such as amino, aminopropyl, ethylene diaminopropyl, aminophenyl, aminooctadecyl, aminocyclohexyl, propylene diaminopropyl, dimethylamino, and diethylamino.

Acetoxy groups suitable as $R^1$ in the compositions of the present invention are exemplified by groups having the formula —$COOCH_3$ such as acetoxyalkyl groups, acetoxyaryl groups, acetoxycycloalkyl groups, and acetoxycycloaryl groups. Preferred acetoxy groups in the compositions of the instant invention include acetoxy, acetoxyethyl, acetoxypropyl, acetoxybutyl, acetoxyphenyl, and acetoxycyclohexyl.

Sulfo groups which are preferred as $R^1$ in the compositions of the present invention are exemplified by groups having the formula SR wherein R is hydrogen or a monovalent hydrocarbon radical having from 1 to 20 carbon atoms such as sulfoalkyl groups, sulfoaryl groups, sulfocycloalkyl groups, and sulfocycloaryl groups. Preferred sulfo groups include hydrogen sulfide, sulfopropyl, methylsulfopropyl, sulfophenyl, and methylsulfo.

Fluoro groups are exemplified by groups such as fluoroalkyl groups, fluoroaryl groups, fluorocycloalkyl groups, and fluorocycloaryl groups. Preferred fluoro groups which are suitable as $R^1$ in the compositions of this invention include fluoro, fluoropropyl, fluorobutyl, 3,3,3-trifluoropropyl, and 3,3,4,4,5,5,6,6,6-nonafluorohexyl.

Alkoxy groups suitable as $R^1$ in component (D) of this invention include groups such as alkoxyalkyl groups, alkoxyaryl groups, alkoxycycloalkyl groups, and alkoxycycloaryl groups. Preferred alkoxy groups for $R^1$ in the present invention are groups such as methoxy, ethoxy, butoxy, tertiary-butoxy, propoxy, isopropoxy, methoxyphenyl, ethoxyphenyl, methoxybutyl, and methoxypropyl groups.

Epoxy groups suitable as $R^1$ in component (D) of this invention include groups such as epoxyalkyl groups, epoxyaryl groups, epoxycycloalkyl groups, and epoxycycloaryl groups. Preferred epoxy groups for $R^1$ in the present invention are groups such as epoxide, epichlorohydrin, ethylene oxide, epoxybutane, epoxycyclohexane, epoxy ethylhexanol, epoxy propanol, and epoxy resin groups.

Acrylate groups suitable as $R^1$ in the formulae hereinabove include groups such as acryloxyalkyl groups, acryloxyaryl groups, acryloxycycloalkyl groups, and acryloxycycloaryl groups. Preferred acrylate groups suitable as $R^1$ in the instant invention are selected from the group consisting of acryloxyethyl, acryloxyethoxy, acryloxypropyl, acryloxypropoxy, methacryloxyethyl, methacryloxyethoxy, methacryloxypropyl, and methacryloxypropoxy.

Ether groups can also be used as $R^1$ in the formulae hereinabove. These ether groups can include groups such as alkylethers, arylethers, cycloalkylethers, and cycloarylethers. Preferred ether groups suitable as $R^1$ in the instant invention are selected from the group consisting of methylethylether, methylpropylether, ethylmethylether, ethylethylether, ethylpropylether, methylphenylether, ethylphenylether, isopropylphenylether, tertiary-butylpropylether, methylcyclohexylether, and ethylcyclohexylether.

The olefinic hydrocarbon radicals of $R^1$ of the present invention may have from 2 to 20 carbon atoms. The olefinic hydrocarbon radicals are preferably selected from the group consisting of the vinyl radical and higher alkenyl radicals represented by the formula —$R(CH_2)_mCH=CH_2$ wherein R denotes —$(CH_2)_n$— or —$(CH_2)_pCH=CH$— and m has the value of 1, 2, or 3, n has the value of 3 or 6, and p has the value of 3, 4, or 5. The higher alkenyl radicals represented by the formula —$R(CH_2)_m CH=CH_2$ contain an least 6 carbon atoms. For example, when R denotes —$(CH_2)_n$—, the higher alkenyl radicals include 5-hexenyl, 6- heptenyl, 7-octenyl, 8-nonenyl, 9-decenyl, and 10-undecenyl. When R denotes —$(CH_2)_pCH=CH$—, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl, are preferred. It is more preferred that R denote —$(CH_2)_n$— so that the radicals contain only terminal unsaturation and the most preferred radicals are the vinyl radical and the 5- hexenyl radical.

Specific examples of preferred polydiorganosiloxanes for use as Component (E) in the compositions of the present invention include $ViMe_2SiO(Me_2SiO)_xSiMe_2Vi$, $HexMe_2SiO(Me_2SiO)_x(MeHexSiO)_ySiMe_2Hex$, $ViMe_2SiO(Me_2SiO)_x(MeViSiO)_ySiMe_2Vi$, $HexMe_2SiO(Me_2SiO)_{196}(MeHexSiO)_4SiMe_2Hex$, $HexMe_2SiO(Me_2SiO)_{198}(MeHexSiO)_2SiMe_2Hex$, $HexMe_2SiO(Me_2SiO)_{151}(MeHexSiO)_3SiMe_2Hex$, $ViMe_2SiO$ $(Me_2SiO)_{96}(MeViSiO)_2SiMe_2Vi$, HexMe$_2$SiO(Me$_2$SiO)$_x$SiMe$_2$Hex,
PhMeViSiO(Me$_2$SiO)$_x$SiPhMeVi, HexMe$_2$SiO(Me$_2$SiO)$_{130}$SiMe$_2$Hex, ViMePhSiO (Me$_2$SiO)$_{145}$SiPhMeVi, ViMe$_2$SiO(Me$_2$SiO)$_{299}$SiMe$_2$Vi,
ViMe$_2$SiO(Me$_2$SiO)$_{800}$SiMe$_2$Vi,
ViMe$_2$SiO(Me$_2$SiO)$_{300}$SiMe$_2$Vi,
ViMe$_2$SiO(Me$_2$SiO)$_{198}$SiMe$_2$Vi, vinyldimethylsiloxy-terminated poly((3,3,3-trifluoropropyl)methylsiloxy) pentasiloxane, vinylmethylsiloxy-terminated polydimethylsiloxane having (3,3,4,4,5,5,6,6-nonafluorobutyl)methylsiloxy functional groups, vinyldimethylsiloxy-terminated polydimethyldodecasiloxane having (3,3,3-trifluoropropyl)methylsiloxy groups, vinylmethylsiloxy-terminated polydimethylsiloxane having (3,3,4,4,5,5,6,6-nonafluorobutyl)methylsiloxy functional groups, dimethylhydridosiloxy-terminated poly((3,3,3-trifluoropropyl)methylsiloxy) pentasiloxane, dimethylhydroxysiloxy-terminated polydimethylsiloxane, and dimethylhydroxysiloxy-terminated dimethyl(aminoethylaminopropyl)methyl siloxane, wherein Me, Vi, Hex, and Ph denote methyl, vinyl, 5-hexenyl and phenyl, respectively.

The amount of Component (E) employed in the compositions of the present invention varies depending on the amount of organohydrogensiloxane, rhodium catalyst, unsaturated acetate, and alcohol, that is employed. It is preferred for purposes of this invention that from 1 to 99 weight percent of (E), the organosilicon compound, be used, and it is highly preferred that from 70 to 95 weight percent of (E) be employed, said weight percent being based on the total weight of the composition.

The fiber treatment compositions of the instant invention can further comprise (F) a dispersant selected from the group consisting of one or more surfactants and one or more solvents. The (emulsifying agents) surfactants are preferably of the non-ionic or cationic types and may be employed separately or in combinations of two or more. Suitable emulsifying agents for the preparation of a stable aqueous emulsion are known in the art. Examples of nonionic surfactants suitable as component (F) of the present invention include polyoxyethylene alkyl ethers, polyoxyethylene alkylphenol ethers, polyoxyethylene lauryl ethers and polyoxyethylene sorbitan monoleates such as Brij™ 35L (from ICI Americas Inc., Wilmington, Del. 19897), Brij™ 30 (ICI Americas Inc., Wilmington, Del. 19897), and Tween™ 80 (ICI Americas Inc., Wilmington, Del. 19897), polyoxyethylene alkyl esters, polyoxyethylene sorbitan alkyl esters, polyethylene glycol, polypropylene glycol, ethoxylated trimethylnonanols such as Tergitol® TMN-6 (from Union Carbide Chem. & Plastics Co., Industrial Chemicals Div., Danbury, Conn. 06817-0001), and polyoxyalkylene glycol modified polysiloxane surfactants. Examples of cationic surfactants suitable as component (F) in the compositions of the instant invention include quaternary ammonium salts such as alkyltrimethylammonium hydroxide, dialkyldimethylammonium hydroxide, methylpolyoxyethylene cocoammonium chloride, and diplmityl hydroxyethylammonium methosulfate. Preferably, a combination of two or three nonionic surfactants, or a combination of a cationic surfactant and one or two nonionic surfactants are used to prepare the emulsions of the present invention.

Examples of the preferred surfactants for use as Component (F) in the compositions of this invention are the reaction products of alcohols and phenols with ethylene oxide such as the polyethoxyethers of nonyl phenol and octyl phenol and the trimethylnol ethers of polyethylene glycols, monoesters of alcohols and fatty acids such as glycerol monostearate and sorbitan monolaurate, and the ethoxylated amines such as those represented by the general formula

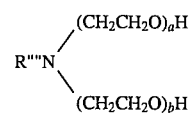

21 in which R"" is an alkyl group having from about 12 to about 18 carbon atoms and the sum of a and b is from 2 to about 15. Silicone surfactants are also suitable for use as Component (F) in the instant invention. Preferred silicone surfactants include silicone polyethers such as polyalkylpolyether siloxanes and silicone glycol surfactants including silicone glycol polymers and copolymers such as those disclosed in U.S. Pat. No. 4,933,002, incorporated herein by reference. The emulsifying agents may be employed in proportions conventional for the emulsification of siloxanes, from about 1 to about 30 weight percent, based on the total weight of the composition.

Solvents may also be employed as Component (F) in the fiber treatment compositions of the instant invention. Preferred solvents for use as Component <F) in the instant invention include hydrocarbon solvents such as dichloromethane (methylene chloride) and acetonitrile. It is preferred for purposes of the present invention that Component (F), the dispersant, be a mixture of water and one or more of the surfactants described hereinabove. It is also preferred that emulsification of the fiber treatment compositions of the instant invention is carried out by adding one or more emulsifying agents, and water be added to components (A), (B), (C), (D), and (E) described hereinabove and the resulting composition be subjected to high shear.

The amount of Component (F) employed in the compositions of the present invention varies depending on the amount of organohydrogensiloxane, rhodium catalyst, alcohol unsaturated acetate, and organosilicon compound that is employed. It is preferred for purposes of this invention than from 0.25 to 99 weight percent of (F), the dispersant, be used, and it is highly preferred that from 1 to 95 weight percent of dispersant be employed, said weight percent being based on the total weight of the composition. When a surfactant is employed it is preferred that from 0.25 to 20 weight percent be used, and when a solvent is employed it is preferred that from 70 to 99.5 weight percent be used, said weight percent being based on the total weight of the composition.

The fiber treatment compositions comprising components (A), (B), (C), and (D) and optionally (E) and any surfactants or solvents (F) may be applied to the fibers by employing any suitable application technique, for example by padding or spraying, or from a bath. For purposes of this invention, the compositions can be applied from a solvent, but is preferred that the compositions be applied from an aqueous medium, for example, an aqueous emulsion. Thus, any organic solvent can be employed to prepare the solvent-based compositions, it being understood that those solvents that are easily volatilized at temperatures of from room temperatures to less than 100° C. are preferred, for example, such solvents may include methylene chloride, acetonitrile, toluene, xylene, white spirits, chlorinated hydrocarbons, and the like. The treating solutions can be prepared by merely mixing the components together with the solvent. The concentration of the treating solution will depend on the desired level of application of siloxane to the fiber, and on the method of application employed, but it is believed by the inventors herein than the most effective amount of the composition should be in the range such that the fiber (or fabric) picks up the silicone composition at about 0.05% to 10% on the weight of the fiber or fabric. According to the instant method of treatment, the fibers usually in the form of tow, or knitted or woven fabrics, are immersed in an aqueous emulsion of the compositions whereby the composition becomes selectively deposited on the fibers. The deposition of the composition on the fibers may also be expedited by increasing the temperatures of the aqueous emulsion, temperatures in the range of from 20° to 60° C. being generally preferred.

Preparation of the aqueous emulsions can be carried out by any conventional technique. The fiber treatment compositions of this can be prepared by homogeneously mixing Components (A), (B), (C) and (D) and any optional components in any order. Thus it is possible to mix all components in one mixing step immediately prior to using the fiber treatment compositions of the present invention. Most preferably (A), (B), and (C), are emulsified and then (D) and/or (E) is emulsified individually and the two emulsions thereafter combined and then any optional components added. The emulsions of the present invention may be macroemulsions or microemulsions and may also contain optional ingredients, for example antifreeze additives, preservatives, biocides, organic softeners, antistatic agents, dyes and flame retardants. Preferred preservatives include Kathon® LX (5-chloro-2-methyl-4-isothiazolin-3-one from Rohm and Haas, Philadelphia, Pa. 19106), Giv-gard® DXN 6-acetoxy-2,4-dimethyl-m-dioxane from Givaudan Corp., Clifton N.J. 07014), Tektamer® A.D. (from Calgon Corp., Pittsburgh Pa. 152300), Nuosept® 91,95 (from Huls America, Inc., Piscataway, N.J. 08854), Germaben® (diazolidinyl urea and parabens from Sutton Laboratories, Chatham, N.J. 07928), Proxelφ (from ICI Americas Inc., Wilmington, Del. 19897), methyl paraben, propyl paraben, sorbic acid, benzoic acid, and lauricidin.

Following the application of the siloxane composition the siloxane is then cured. Preferably, curing is expedited by exposing the treated fibers to elevated temperatures, preferably from 50° to 200° C.

The fiber treatment compositions of this invention can be employed for the treatment of substrates such as animal fibers such as wool, cellulosic fibers such as cotton, and synthetic fibers such as nylon, polyester and acrylic fibers, or blends of these materials, for example, polyester/cotton blends, and may also be used in the treatment of leather, paper, and gypsum board. The fibers may be treated in any form, for example as knitted and woven fabrics and as piece goods. They may also be treated as agglomerations of random fibers as in filling materials for pillows and the like such as fiberfil.

The fiber treatment composition of components (A), (B), (C), and (D) and any optional components should be used at about 0.05 to 25 weight percent in the final bath for exhaust method applications, and about 5 gm/l to 80 gm/l in a padding method of application, and about 5 gm/l to 600 gm/l for a spraying application. The compositions employed in this process are particularly suitable for application to the fibers or fabrics from an aqueous carrier. The compositions can be made highly substantive to the fibers, that is they can be made to deposit selectively on such fibers when applied thereto as aqueous emulsions. Such a property renders the compositions particularly suited for aqueous batch treatment by an exhaustion procedure, such exhaustion procedures being known to those skilled in the art. The compositions of the instant invention are new and novel and provide a fast cure and wide cure temperature ranges for curing them on fibers or fabrics compared to the compositions of the prior art, having a temperature cure range of from 50° C. to 200° C. Further, the fibers have superior slickness and no oily feeling after cure. The compositions of the instant invention provide consistent performance, good bath life of more than 24 hours at 40° C., have good laundry and dry cleaning durability, and have very good suitability for application by spraying.

Fiber Slickness was tested by using a DuPont(R) unslickened fiberfil product, such as Hollofil® T-808, for the evaluation of slickness imparted by the application of the silicone emulsion of the present invention. A piece of Hollofil® T-808 is soaked in the diluted emulsion of interest and then passed through a roller to obtain 100% wet-pickup, i.e., the weight of the finished fiberfil is twice that of the unfinished fiberfil. After drying at room temperature, the finished sample is heated at 200° C. for 2–25 minutes. Thus prepared, the finished fiberfil usually contains approximately the same silicone level as that of the emulsion of interest.

The slickness of fiberfil is measured by staple pad friction which is determined from the force required to pull a certain weight over a fiberfil staple pad. The staple pad friction is defined as the ratio of the force over the applied weight. A 10 pound weight was used in the friction measurement. A typical instrument set-up includes a friction table which is mounted on the crosshead of an Instron tensile tester. The friction table and the base of the weight are covered with Emery Paper #320 from the 3M Company so that there is little relative movement between the staple pad and the weight or the table. Essentially all of the movement is a result of fibers sliding across each other. The weight is attached to a stainless steel wire which runs through a pulley mounted at the base of the Instron tester. The other end of the stainless steel wire is tied to the loadcell of the Instron tester.

Following are examples illustrating the compositions and methods of the present invention. In the examples hereinbelow, THF denotes tetrahydrofurfuryl, and THFA denotes tetrahydrofururyl alcohol.

EXAMPLES 1–8

In order to illustrate the effectiveness of the catalyst compositions of the invention the following tests were conducted. A rhodium catalyst complex was prepared by dissolving $RhCl_3.6H_2O$ in a complexing solvent. This solution was then added at 6 parts per million (ppm) to a mixture of 100 gm of a trimethylsilyl terminated polymethylhydrogensiloxane having a viscosity of 30 centistokes at a temperature of 25° C. and having the formula $Me_3SiO(MeHSiO)_{70}SiMe_3$ and 10 gm of Linallyl acetate. The final formulation was placed in a 50° C. air oven and watched for 168 hours or until it gelled. The type of complexing solvent and the number of hours the sample took to gel is recorded in Table I hereinbelow.

TABLE I

| Example | Rhodium | Complexing Solvent | Hours to Gel 50° C. Air Oven |
|---|---|---|---|
| 1 | $RhCl_3.6H_2O$ | Tetrahydrofuran | 16 |
| 2 | $RhCl_3.6H_2O$ | 2,5-Dimethytetrahydrofuran | 16 |
| 3 | $RhCl_3.6H_2O$ | Tetrahydro-3-furan methanol | passed 168 |
| 4 | $RhCl_3.6H_2O$ | furfuryl alcohol | passed 168 |
| 5 | $RhCl_3.6H_2O$ | Tetrahydrofurfuryl alcohol | passed 168 |
| 6 | $RhCl_3.6H_2O$ | Benzyl alcohol | 72 |
| 7 | $RhCl_3.6H_2O$ | 1,4-Butanediol | 84 |
| 8 | $RhCl_3.6H_2O$ | Methanol | <1 |

It is clear from Table I that the rhodium catalyst complexes containing alcohols having greater than 3 carbon atoms outperformed the catalysts which do not contain an alcohol or which contain an alcohol having less than 3 carbon atoms by remaining stable for a much longer period of time.

EXAMPLES 9–11

In order to illustrate the effectiveness of the fiber treatment compositions of the present invention the following tests were conducted. A 0.03 molar rhodium catalyst solution was prepared by dissolving 1 gram of $RhCl_3 \cdot 6H_2O$ (rhodium trichloride hexahydrate) in 120 grams of THFA.

Into a glass container was added the unsaturated acetate (in this case linallyl acetate). With gentle mixing using a round edge three blade turbine mixing impeller, the rhodium catalyst solution prepared above was added to the unsaturated acetate and mixed until the mixture was homogenous. Next, 100 grams of a trimethylsilyl terminated polymethylhydrogensiloxane having a viscosity of 30 centistokes an a temperature of 25° C. and having the formula $Me_3SiO(MeHSiO)_{70}SiMe_3$ was added to the mixture and stirred gently until the mixture was again homogenous. This was followed by adding about 1.78 grams of a methylene chloride solvent, and about 38 grams of water containing up to 0.22 grams of a preservative (sorbic acid) to the mixture. Mixing was then resumed at medium speed for 20 to 30 minutes. The mixture was then processed through a high shear device to produce the emulsions of the instant invention. The particle sizes of the emulsions ranged from 0.7 to 3.0 microns and the pH of the emulsions ranged from 3.0 to 4.5.

A relative ranking from 1 to 10 was established using known commercial finishes based upon slickness values obtained using the Staple Pad Friction frictional test described hereinabove. No finish was given a ranking of 1, the commercial finish was given a ranking of 6, and a premium finish was given a ranking of 10. The amount of acetate, acetate type, the amount of catalyst, catalyst type, the time it took the sample to cure in minutes (min.), and the performance of each example are reported in Table II hereinbelow.

TABLE II

| Example | Acetate (g) | Acetate Type | Catalyst (g) | Catalyst Type | Cure (Min.) | Rating |
| --- | --- | --- | --- | --- | --- | --- |
| 9 | 3 | Linallyl | 0.3 | RhCl$_3$, THFA | 3 | 10 |
| 10 | 2 | Linallyl | 0.2 | RhCl$_3$, THFA | 3 | 10 |
| 11 | 3 | Linallyl | 0.1 | RhCl$_3$, THFA | 3 | 10 |

The examples hereinabove show that fiber treatment compositions containing the rhodium catalyst complexes of the instant invention gave superior slickness results.

EXAMPLE 12

In order to illustrate the effectiveness of the fiber treatment compositions of the present invention the following test was conducted. A 0.03 molar rhodium catalyst solution was prepared by dissolving 1 gram of $RhCl_3 \cdot 6H_2O$ (rhodium trichloride hexahydrate) in 120 grams of THFA.

Into a glass container was added 4 grams of linallyl acetate. With gentle mixing using a round edge three blade turbine mixing impeller, 0.1 grams of the rhodium catalyst solution prepared above was added to the acetate and mixed until the mixture was homogenous. Next, a mixture of 100 grams of a trimethylsilyl terminated polymethylhydrogensiloxane having a viscosity of 30 centistokes at a temperature of 25° C. and having the formula $Me_3SiO(MeHSiO)_{70}SiMe_3$ and 10 grams of a 250 cps polydimethylsiloxane having 8% pendant alkylsulfocarboxy moieties was added to the mixture and stirred gently until the mixture was again homogenous. This was followed by adding about 1.78 grams of a polyoxyethylene lauryl ether surfactant, and about 38 grams of water containing up to about 0.22 grams of a preservative (sorbic acid) to the mixture. Mixing was then resumed at medium speed for 20 to 30 minutes. The mixture was then processed through a high shear device to produce the emulsions of the instant invention. The particle sizes of the emulsions ranged from 0.7 to 3.0 microns and the pH of the emulsions ranged from 3.0 to 4.5.

The sample was ranked as described hereinabove and was obtained using the Staple Pad Friction frictional test described hereinabove. The sample took 10 minutes to cure and had a slickness value of 10.

This example show that the catalysts of the instant invention when incorporated into a fiber treatment composition containing organosilicon compounds cure into fiber treatment compositions to give good slickness ratings.

COMPARISON EXAMPLE I

A silicone composition was prepared according to the disclosure of Revis, U.S. Pat. Nos. 4,954,401, 4,954,597, and 5,082,735. A 0.03 molar rhodium catalyst solution was prepared by dissolving 1 gram of $RhCl_3 \cdot 6H_2O$ (rhodium trichloride hexahydrate) in 120 grams of THF. Into a glass container was added 5 grams of allyl acetate. With gentle mixing using a round edge three blade turbine mixing impeller, 0.1 grams of the catalyst solution prepared above was added to the acetate and mixed until the mixture was homogenous. Next, 100 grams of a trimethylsilyl terminated polymethylhydrogensiloxane having a viscosity of 30 centistokes at a temperature of 25° C. and having the formula $Me_3SiO(MeHSiO)_{70}SiMe_3$ was added to the mixture and stirred gently until the mixture was again homogenous. Next, 4 grams of this mixture was added to 96 grams of water. This mixture was then stirred for 20 to 30 minutes.

The sample was ranked as described hereinabove and was obtained using the Staple Pad Friction frictional test described hereinabove. The sample took 10 minutes to cure and had a slickness value of 2. Thus in comparison to the compositions of the instant invention that fiber treatment compositions not containing the catalyst compositions of the instant invention gave much poorer results.

COMPARISON EXAMPLE II

A silicone composition was prepared according to Example 2 of Revis, U.S. Pat. No. 4,954,401. A catalyst was prepared according Example 1 of Revis, U.S. Pat. No. 4,954,401, by stirring 10 grams of $RhCl_3 \cdot 3H_2O$ in 1200 grams of THF at room temperature for about 12 hours. A mixture of 2.0 grams of trimethylsilyl terminated polymethylhydrogensiloxane having a viscosity of 30 centistokes at a temperature of 25° C., 3.5 grams of allyl acetate, and 0.02 grams of catalyst was combined and stirred gently until the mixture was homogenous.

The sample was ranked as described hereinabove and was this ranking obtained using the Staple Pad Friction frictional test described hereinabove. The sample took 10 minutes to cure and the sample fibers were fused together and became extremely brittle thus preventing the detection of a slickness value (i.e. the sample failed). Thus in comparison to the compositions of the instant invention, compositions which did not contain the catalyst of the instant invention gave much poorer results than do the compositions of the instant invention.

COMPARISON EXAMPLE III

A silicone composition was again prepared according to Example 2 of Revis, U.S. Pat. No. 4,954,401. A catalyst was again prepared according Example 1 of Revis, U.S. Pat. No. 4,954,401, by stirring 10 grams of $RhCl_3.3H_2O$ in 1200 grams of THF at room temperature for about 12 hours. The amounts of the ingredients in this example were varied however. In this example a mixture of 100 grams of trimethylsilyl terminated polymethylhydrogensiloxane having a viscosity of 30 centistokes at a temperature of 25° C., 10 grams of allyl acetate, and 0.1 grams of catalyst was combined and stirred gently until the mixture was homogenous.

The sample was again subjected to the tests described hereinabove. Again, the sample took 10 minutes to cure and the sample fibers were fused together and became extremely brittle thus preventing the detection of a slickness value (i.e. the sample failed). Thus in comparison to the fiber treatment compositions of the instant invention containing the novel rhodium catalyst complex of this invention, compositions which do not contain an alcohol having at least 3 carbon atoms gave much poorer results.

COMPARISON EXAMPLE IV

A first emulsion was prepared in the following manner. About 2 weight percent of an aqueous solution of a mixture of two partially hydrolyzed PVA's (polyvinyl alcohols) having a degree of hydrolysis of 88% and a 4% aqueous solution viscosity of 5 centipoise (cP) and 24 centipoise (cP) at 25° C., respectively, and about 0.3 weight percent of a polyoxyethylene (10) nonyl phenol surfactant was mixed with 28 weight percent of water. Next, 13.5 weight percent of an organohydrogenpolysiloxane having the formula $Me_3SiO(MeHSiO)_5(Me_2SiO)_3SiMe_3$, and 28 weight percent of a dimethylvinylsiloxy-terminated polydimethylmethylvinylsiloxane having a viscosity of 350 cP were mixed and stirred. Next, the PVA-surfactant mixture was added to the siloxane mixture and stirred. This mixture was then processed through a colloid mill and diluted with 28 weight percent of water containing a biocide to form an emulsion.

A second emulsion was prepared by mixing 2 weight percent of an aqueous solution of a mixture of two partially hydrolyzed PVA's (polyvinyl alcohols) having a degree of hydrolysis of 88% and a 4% aqueous solution viscosity of 5 centipoise (cP) and 24 centipoise (cP) at 25° C., respectively, about 0.3 weight percent of a polyoxyethylene (10) nonyl phenol surfactant, and 28 weight percent of water. Next, about 40 weight percent of dimethylvinylsiloxy-terminated polydimethylmethylvinylsiloxane having a viscosity of 350 cP and about 1% of a platinum-containing catalyst were mixed and stirred. Next, the PVA-surfactant mixture was added to the siloxane mixture and stirred. This mixture was then processed through a colloid mill and diluted with 28 weight percent of water containing a biocide to form an emulsion.

Next, 7.5 grams of the first emulsion, 7.5 grams of the second emulsion, and 85 grams of water were mixed together and the resulting emulsion stirred.

This silicone emulsion cured in 10 minutes and the sample was ranked according to the staple pad friction procedure delineated hereinabove. The silicone emulsion attained a rating of between 4 and 5.

COMPARISON EXAMPLE V

A silicone emulsion was prepared according to the disclosure of Bunge in U.S. Pat. No. 4,954,554. A first emulsion was prepared in the following manner. About 38 weight percent of a dimethylvinylsiloxy-terminated polydimethylsiloxane having a viscosity of 450 centistokes (cst) and 2 weight percent of a mixture of an organohydrogenpolysiloxane having the formula $Me_3SiO(MeHSiO)_5(Me_2SiO)_3SiMe_3$ and a dimethylsiloxane-methylhydrogensiloxane having a viscosity of 85 centistokes (cst) were mixed and stirred. About 2 weight percent of an aqueous solution of an intermediately hydrolyzed PVA having a degree of hydrolysis of 96% and a 4% aqueous solution viscosity of 30 centipoise (cP) at 25° C., a surfactant, and 29 weight percent of water were mixed and stirred. Next, the PVA-surfactant mixture was added to the siloxane mixture and stirred. This mixture was then processed through a colloid mill and diluted with 29 weight percent of water containing a biocide to form an emulsion.

A second emulsion was prepared by mixing about 2 weight percent of an aqueous solution of an intermediately hydrolyzed PVA having a degree of hydrolysis of 96% and a 4% aqueous solution viscosity of 30 centipoise (cP) at 25° C., a surfactant, and 51 weight percent of water. Next, about 40 weight percent of a dimethylvinylsiloxy-terminated polydimethylsiloxane having a viscosity of 450 cP and about 1% of a platinum-containing catalyst were mixed and stirred. Next, the PVA-surfactant mixture was added to the siloxane mixture and stirred. This mixture was then processed through a colloid mill and 7 weight percent of water containing a biocide was added to form an emulsion.

Next, 7.5 grams of the first emulsion, 7.5 grams of the second emulsion, and 85 grams of water were mixed together and the resulting emulsion stirred.

This silicone emulsion cured in 10 minutes and the sample was ranked according to the staple pad friction procedure delineated hereinabove. The silicone emulsion attained a rating of between 5 and 6. Thus the compositions of the instant invention outperformed the silicone emulsions previously described in the art.

It should be apparent from the foregoing that many other variations and modifications may be made in the compounds, compositions and methods described herein without departing substantially from the essential features and concepts of the present invention. Accordingly it should be clearly understood that the forms of the invention described herein are exemplary only and are not intended as limitations on the scope of the present invention as defined in the appended claims.

That which is claimed is:

1. A fiber treatment composition comprising:
   (A) a rhodium catalyst;
   (B) an allyl ester, vinyl ester, or unsaturated acetate;
   (C) an alcohol selected from the group consisting of $C_6$ to $C_{15}$ alcohols, diols, furans having at least one OH group per molecule, and pyrans having at least one OH group per molecule; and (D) at least one organohydrogensiloxane.

2. A composition according to claim 1, wherein (A) is selected from the group consisting of $RhCl_3$, $RhBr_3$, and $RhI_3$.

3. A composition according to claim 1, wherein (A) is selected from the group consisting of $RhCl_3 \cdot nH_2O$, $RhBr_3 \cdot nH_2O$, $Rh(NO_3)_3 \cdot nH_2O$, and $Rh(SO_4)_3 \cdot nH_2O$, and n has a value of from 1 to 10.

4. A composition according to claim 1, wherein (B) is selected from the group consisting of allyl acetate, linallyl acetate, and isopropenyl acetate.

5. A composition according to claim 1, wherein the diols are selected from the group consisting of 1,2-propanediol, 1,3-propanediol, 1,3-butanediol, 1,4-butanediol, 1,2-pentanediol, 1,4-pentanediol, 1,5-pentanediol, 1,6-hexanediol, 1,5-hexanediol, 1,7-heptanediol, 1,9-nonadiol, 1,2-decanediol, 1,10-decanediol, and 2-phenyl-1,2-propanediol.

6. A composition according to claim 1, wherein the $C_6$ to $C_{15}$ alcohols are selected from the group consisting of 1-heptanol, benzyl alcohol, 1-octanol, 1-nonanol, 1-decanol, undecylenyl alcohol, 2,4-dichlorobenzyl alcohol, phenethyl alcohol, 1-undecanol, 2-methylbenzyl alcohol, 3-methylbenzyl alcohol, and 2-phenyl-1-propanol.

7. A composition according to claim 1, wherein the furans are selected from the group consisting of 5-methyl tetrahydrofuran-2-methanol, 2-hydroxy-2-(hydroxymethyl) tetrahydrofuran, dihydro-5-(hydroxymethyl)-2-(3H)-furone, tetrahydro-3-furan methanol, furfuryl alcohol, and tetrahydrofurfuryl alcohol.

8. A composition according to claim 1, wherein the pyran is tetrahydropyran-2-methanol.

9. A composition according to claim 1, wherein (D) is selected from the group consisting of bis(trimethylsiloxy)dimethyldihydrogendisiloxane, diphenyldimethyldisiloxane, diphenyltetrakis(dimethylsiloxy)disiloxane, heptamethylhydrogentrisiloxane, hexamethyldihydrogentrisiloxane, methylhydrogencyclosiloxanes, methyltris(dimethylhydrogensiloxy)silane, pentamethylpentahydrogencyclopentasiloxane, pentamethylhydrogendisiloxane, phenyltris(dimethylhydrogensiloxy)silane, polymethylhydrogensiloxane, tetrakis(dimethylhydrogensiloxy)silane, tetramethyltetrahydrogencyclotetrasiloxane, tetramethyldihydrogendisiloxane, and methylhydrogendimethylsiloxane copolymers.

10. A composition according to claim 1, wherein the composition further comprises (E) an organosilicon compound having an average of at least one group per molecule selected from hydroxy groups, carboxy groups, ester groups, amino groups, acetoxy groups, sulfo groups, alkoxy groups, acrylate groups, epoxy groups, fluoro groups, ether groups, olefinic hydrocarbon or halohydrocarbon radicals having from 2 to 20 carbon atoms, or mixtures thereof.

11. A composition according to claim 10, wherein (E) is a compound having its formula selected from the group consisting of (i) $R^1_3SiO(R_2SiO)_x(R^1RSiO)_ySiR^1_3$ (ii) $R_2R^1SiO(R_2SiO)_x(R^1RSiO)_ySiR_2R^1$ (iii) $RR^1_2SiO(R_2SiO)_x(R^1RSiO)_ySiRR^1_2$ wherein R is a monovalent hydrocarbon or halohydrocarbon radical having from 1 to 20 carbon atoms, $R^1$ is a group selected from the group consisting of hydroxy, hydroxyalkyl, hydroxyaryl, hydroxycycloalkyl, hydroxycycloaryl, carboxy, carboxyalkyl, carboxyaryl, carboxycycloalkyl, carboxycycloaryl, alkylester, arylester, cycloalkylester, cycloarylester, amino, aminoalkyl, aminoaryl, aminocycloalkyl, aminocycloaryl, acetoxy, acetoxyalkyl, acetoxyaryl, acetoxycycloalkyl, acetoxycycloaryl, sulfoalkyl, sulfoaryl, sulfocycloalkyl, sulfocycloaryl, alkoxy, alkoxyalkyl, alkoxyaryl, alkoxycycloalkyl, alkoxycycloaryl, acryloxy, acryloxyalkyl, acryloxyaryl, acryloxycycloalkyl, acryloxycycloaryl, epoxy, epoxyalkyl, epoxyaryl, epoxycycloalkyl, epoxycycloaryl, fluoro, fluoroalkyl, fluoroaryl, fluorocycloalkyl, fluorocycloaryl, alkylether, arylether, cycloalkylether, cycloarylether, olefinic hydrocarbon or halohydrocarbon radicals having from 2 to 20 carbon atoms, and mixtures thereof, x has a value of 0 to 3000, and y has a value of 1 to 100.

12. A composition according to claim 11, wherein $R^1$ selected from the group consisting of hydroxy, hydroxypropyl, hydroxybutyl, hydroxyphenyl, hydroxymethylphenyl hydroxyethylphenyl, and hydroxycyclohexyl.

13. A composition according to claim 11, wherein $R^1$ is selected from the group consisting of carboxy, carboxymethyl, carboxyethyl, carboxypropyl, carboxybutyl, carboxyphenyl, carboxymethylphenyl, carboxyethylphenyl, and carboxycyclohexyl.

14. A composition according to claim 11, wherein $R^1$ is selected from the group consisting of ethyl acetate, methyl acetate, n-propyl acetate, n-butyl acetate, phenyl acetate, benzyl acetate, isobutyl benzoate, ethyl benzoate, ethyl propionate, ethyl stearate, ethyl trimethylacetate, methyl laurate, and ethyl palmitate.

15. A composition according to claim 11, wherein $R^1$ is selected from the group consisting of amino, aminopropyl, ethylene diaminopropyl, aminophenyl, aminooctadecyl, aminocyclohexyl, propylene diaminopropyl, dimethylamino, and diethylamino.

16. A composition according to claim 11, wherein $R^1$ is acetoxy groups are selected from the group consisting of acetoxy, acetoxyethyl, acetoxypropyl, acetoxybutyl, acetoxyphenyl, and acetoxycyclohexyl.

17. A composition according to claim 11, wherein $R^1$ is selected from the group consisting of sulfo, hydrogen sulfide, sulfopropyl, methylsulfopropyl, sulfophenyl, and methylsulfo.

18. A composition according to claim 11, wherein $R^1$ is selected from the group consisting of fluoro, fluoropropyl, fluorobutyl, 3,3,3-trifluoropropyl, and 3,3,4,4,5,5,6,6,6-nonafluorohexyl.

19. A composition according to claim 11, wherein $R^1$ is selected from the group consisting of methoxy, ethoxy, butoxy, tertiary-butoxy, propoxy, isopropoxy, methoxyphenyl, ethoxyphenyl, methoxybutyl, and methoxypropyl groups.

20. A composition according to claim 11, wherein $R^1$ is selected from epoxide, epichlorohydrin, ethylene oxide, epoxybutane, epoxycyclohexane, epoxy ethylhexanol, epoxy propanol, or epoxy resin groups.

21. A composition according to claim 11, wherein $R^1$ is selected from the group consisting of acryloxyethyl, acryloxyethoxy, acryloxypropyl, acryloxypropoxy, methacryloxyethyl, methacryloxyethoxy, methacryloxypropyl, and methacryloxypropoxy.

22. A composition according to claim 11, wherein $R^1$ is selected from the group consisting of methylethylether, methylpropylether, ethylmethylether, ethylethylether, ethylpropylether, methylphenylether, ethylphenylether, isopropylphenylether, tertiary-butylpropylether, methylcyclohexylether, and ethylcyclohexylether.

23. A composition according to claim 11, wherein the olefinic hydrocarbon radicals are selected from the group consisting of vinyl and hexenyl radicals.

24. A composition according to claim 1, wherein (B) is selected from the group consisting of allyl butyrate, allyl acetate, linallyl acetate, allyl methacrylate, vinyl acetate, allyl acrylate, vinyl butyrate, isopropenyl acetate, vinyl trifluoroacetate, 2-methyl-1-butenyl acetate, vinyl 2-ethyl hexanoate, vinyl 3,5,5-trimethylhexanoate, allyl 3-butenoate, bis-(2-methylallyl) carbonate, diallyl succinate, and ethyl diallylcarbamate.

25. A composition according to claim 1, wherein the composition further comprises a dispersant selected from the group consisting of surfactants and solvents.

26. A composition according to claim 10, wherein the composition further comprises a dispersant selected from the group consisting of surfactants and solvents.

27. A composition according to claim 26, wherein the dispersant is selected from the group consisting of polyoxyethylene alkyl ether, polyoxyethylene alkylphenol ether, polyoxyethylene alkyl ester, polyoxyethylene sorbitan alkyl ester, polyethylene glycol, polypropylene glycol, polyoxyalkylene glycol modified polysiloxanes, alkyltrimethylammonium hydroxide, dialkyldimethylammonium hydroxide, methylpolyoxyethylene cocoammonium chloride, and dipalmityl hydroxyethylammonium methosulfate, polyethoxyethers of nonyl phenol and octyl phenol, trimethylnol ethers of polyethylene glycols, monoesters of alcohols and fatty acids, ethoxylated amines, methylene chloride, and acetonitrile.

28. A substrate coated with the composition of claim 1.
29. A substrate coated with the composition of claim 10.
30. A substrate coated with the composition of claim 25.
31. A substrate coated with the composition of claim 26.

\* \* \* \* \*